Figure 1:
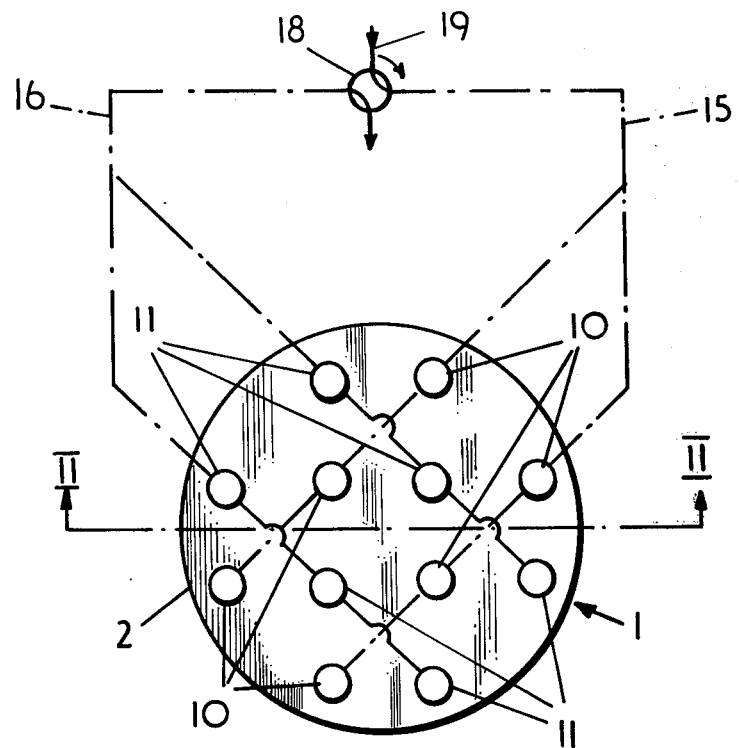

United States Patent [19]

Hillyar-Russ

[11] 4,153,375

[45] May 8, 1979

[54] METHOD OF AGITATING SLURRIES

[75] Inventor: Geoffrey Hillyar-Russ, Burton-on-Trent, England

[73] Assignee: Coal Industry (Patents) Limited, London, England

[21] Appl. No.: 787,364

[22] Filed: Apr. 13, 1977

[30] Foreign Application Priority Data

Apr. 30, 1976 [GB] United Kingdom ............... 17684/76

[51] Int. Cl.² ............................................. B01F 13/00
[52] U.S. Cl. ..................................... 366/275; 210/19; 210/356
[58] Field of Search ...................... 259/4 R, 18, 19, 36, 259/37, 60, 61, 99, 114; 210/19, 21, 22, 83, 356; 222/196, 203; 366/275

[56] References Cited

U.S. PATENT DOCUMENTS

| 2,646,905 | 7/1953 | Vincent | 222/203 X |
| 2,654,482 | 10/1953 | Robinson et al. | 210/356 |
| 3,337,094 | 8/1967 | Houston | 259/37 X |
| 3,551,330 | 12/1970 | Jernqvist et al. | 210/19 |

FOREIGN PATENT DOCUMENTS 522483  9/1953  Belgium ................................. 210/356

Primary Examiner—Philip R. Coe
Attorney, Agent, or Firm—James C. Wray

[57] ABSTRACT

An apparatus for agitating a slurry to increase its settling rate has at least one fluid inflatable container capable of being inflated and deflated, which is immersed in the slurry, and a control to feed the container with fluid to inflate it, and to interrupt the feed during deflation. The apparatus is simple, effective and permits variation in the agitation.

19 Claims, 2 Drawing Figures

METHOD OF AGITATING SLURRIES

This invention relates to methods of agitating slurries.

In particular, although not exclusively, the present invention relates to methods of agitating slurries in a settling tank in order to urge settling of particulate material included in the slurries.

With prior known apparatus for agitating slurries, the feed is introduced at or near the top of a settling vessel such that particulate material tends to settle towards the base of the vessel where it is extracted via an outlet. Clear liquid from which substantially all the particulate material has settled is allowed to overflow the top of the settling vessel. In order to increase the rate of settling of the particulate material it has been found advantageous to gently agitate the contents of the settling vessel. Prior known agitators frequently comprise a plurality of horizontally extending members mounted on a rotating vertical shaft immersed in the slurry. Unfortunately, with such an agitator the radially outer portions of the members have much higher speed than the radially inner portions. Consequently, the agitation of the slurry is greater as the distance along the members from the shaft increases. Therefore, such a prior known agitator has the disadvantage that optimum agitation can only be achieved over a relatively short length of the member and a compromise has to be accepted with the slurry in the vicinity of the shaft being under agitated having little effect on the settling rate while slurry in the vicinity of the radially outer portions of the members is over agitated tending to prevent settling of the particulate material. Other disadvantages of such prior known agitators is that they tend to be very heavy and expensive to install and to run.

Other prior known agitators comprise members vertically suspended in the slurry and repeatedly traversed up and down. Unfortunately, these agitators have the disadvantages that they tend to be complicated, difficult to maintain and expensive to install and run.

An aim of the present invention is to provide a method of agitating slurries which tend to overcome or reduce the above mentioned disadvantages.

The present invention provides a method of agitating slurry wherein at least one portion of fluid inflatable means immersed in the slurry is repeatedly inflated and deflated, said at least one portion being inflated by fluid fed from control means which subsequently interrupt the fluid fed to said at least one portion to permit deflation thereof.

Preferably, the fluid inflatable means comprises a plurality of fluid inflatable containers.

Advantageously, the plurality of fluid inflatable containers are associated with different portions of the fluid inflatable means, the control means feeding fluid to the or each container associated with each portion in a preselected cycle.

Preferably, each container comprises a closed flexible tube or bag having inlet and exhaust means for inflating fluid.

Conveniently, the tube is vertical.

Preferably, locating means are provided to locate the tube in a desired position.

Preferably, the locating means comprise wires or cables securable between the container and a settling vessel containing the slurry.

Alternatively, the locating means comprise weights.

Preferably, the control means comprise valve means for controlling the fluid feed to each container.

Conveniently, the valve means control the exhaust of fluid from each container.

Advantageously, the valve means controls the fluid feed and exhaust to the containers such that the or each container associated with each portion of the fluid inflatable means repeatedly is subjected to inflated and deflated conditions, at any one time the or each container associated with different portions being in a different operational condition to containers associated with other portions of the fluid inflatable means.

Figure 2:
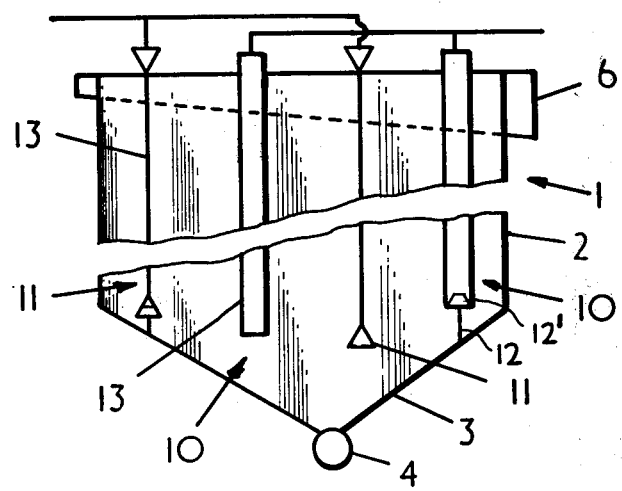

By way of example only, one embodiment of the present invention will be described with reference to the accompanying drawings in which:

FIG. 1 is an incomplete diagrammatic plan of a settling vessel for slurry, the vessel being provided with apparatus constructed in accordance with the present invention; and FIG. 2 is an incomplete diagrammatic sectional view taken along line II—II of FIG. 1.

In the drawings a settling vessel 1 for slurry made up, for example, of fine coal particles and water, comprises a cylindrical side wall 2 and a conical base 3 provided with an outlet valve 4 for settled coal particles. An overflow trough 6 (not shown in FIG. 1) is provided for clear water overflowing from the settling vessel and an inlet pipe (not shown) is provided to feed slurry into the settling vessel.

Apparatus is provided for gently agitating the slurry within the settling vessel 1, the apparatus including fluid inflatable means comprising a plurality of inflatable containers 10, 11 arranged in two banks associated with two portions of the fluid inflatable means, respectively. Each container 10, 11 comprises a vertically arranged deformable tube 13 which is closed at its ends and the lowermost end of which is retained in a desired position by locating means, for example, wires 12 extending between the tube and the settling vessel. Alternatively, the lowermost end of the tube is provided with weights 12' to retain the tube in its desired position. The tubes 13 may be of any suitable material bearing in mind the nature of the slurry, and may, for example, be a fluid proof rubberised fabric. Each tube is supported by support means (not shown) such that it is immersed over at least most of its length in the slurry in the settling vessel.

Each container has a common feed and exhaust 15 or 16 for fluid fed from control means including valve means comprising a rotary valve 18 to inflate the containers. The common feed and exhaust 15 is associated with one bank of containers 10 associated with one portion of the fluid inflatable means and the common feed and exhaust 16 is associated with the other bank of containers 11 associated with the other portion of the fluid inflatable means.

Fluid, for example, compressed air is fed from a driven compressor (not shown) via pipe 19 to the valve 18.

In use, slurry is continuously introduced into the settling vessel 1, the particulate material tending to settle towards the base of the vessel while clear water, substantially free from particulate material, overflows the upper-most end of the cylindrical wall into the overflow trough 6 and is led away.

The rate of settling of the particulate material is increased by agitating the slurry in the vessel by repeated inflation and deflation of the containers 10 and 11 by the compressed air fed via the rotary valve 18. It will be seen from FIG. 1 that with the valve 18 in the operational position as shown in the drawing compressed air is fed via the valve 18 along line 15 to inflate the containers 10 associated with one of the portions of the fluid inflatable means. At the same time the line 16 to the containers 11 associated with the other of the portions of the fluid inflatable means is connected to exhaust via the valve 18. The pressure of the slurry on the containers 11 is to urge the air out of containers 11 causing the associated tubes 13 to deflate.

When the rotary valve has rotated sufficiently, the line 16 is connected to the compressed air feed pipe 19 and the containers 11 associated with said other portion of fluid inflatable means are inflated. Simultaneously, the feed of fluid along line 15 is interrupted and the air from the containers 10 associated with said one portion of the fluid inflatable means is exhausted and the associated tubes 13 are deflated under the pressure of the slurry in the settling vessel.

Thus, it will be appreciated that as the rotary valve 18 is rotated the containers 10 and 11 associated with two portions of the fluid inflatable means are repeatedly inflated and deflated, causing the slurry in the settling vessel to be agitated and increasing the settling rate of the slurry. Since, at any one time the containers 10 or 11 associated with the two portions of the fluid inflatable means, respectively, are in different operational conditions the agitation tends to be constant throughout the settling vessel. Also, as the containers 10 or 11 of one portion are inflating as the containers of the other portion 11 or 10 are deflating the effective total volume of the containers tends to be constant. Hence, the upper level of the slurry tends to remain constant and does not substantially vary with the current operational condition of the apparatus.

Upon feeding compressed air to the containers 10 or 11 the end of the container adjacent to the compressed air feed is first inflated, i.e., the top of the containers as seen in FIG. 2. As more compressed air is fed into the containers the inflated section increasingly extends downward until it reaches the bottom of the container. Upon the valve 18 changing its operational mode, the inflated containers which are switched to exhaust, commence to deflate at their bottom ends, the deflated section increasingly extends upward until all the container is deflated. The above procedure is repeated when the operational mode of the valve is switched once again to feed compressed air to the containers.

Typically, the frequency of operation of the apparatus gives about one to ten pulsations per minute.

In other embodiments of the invention the fluid inflatable means may comprise more than two portions or, the fluid inflatable means may comprise only one container or only one bank of containers.

What is claimed is:

1. A method of agitating a slurry to increase its settling rate comprising repeatedly inflating and deflating at least one portion of a fluid inflatable means which is immersed in a liquid slurry, for gently agitating the liquid slurry and increasing settling rate of particulate material from the slurry and controlling fluid feed to said at least one portion during inflation thereof and subsequently interrupting the fluid feed to said at least one portion during deflation thereof.

2. A method as claimed in claim 1, wherein said inflating said fluid inflatable means comprises inflating a plurality of fluid inflatable containers immersed in liquid.

3. A method as claimed in claim 2, wherein said plurality of fluid inflatable containers are divided in a plurality of portions of said fluid inflatable means and said inflating comprises inflating each portion, and the controlling is adopted to feed fluid to each portion in a preselected cycle immersed in liquid.

4. A method as claimed in claim 3, wherein said inflating each portion itself comprises inflating a plurality of fluid inflatable containers immersed in liquid.

5. The method as claimed in claim 4 wherein each portion has a plurality of fluid inflatable containers arranged in a straight line and wherein the inflating step comprises inflating containers in the straight line of containers crossed with another straight line of containers in another portion.

6. The method as claimed in claim 4 wherein the portions comprise two portions each having containers arranged in parallel lines and wherein the inflating step comprises inflating containers in parallel lines of containers of one portion crossed with parallel lines of containers of another portion.

7. A method as claimed in claim 3, wherein the controlling is adapted to ensure that the different portions are in different operational conditions, whereby the total volume of the inflatable containers does not substantially vary during the cycle of operation.

8. A method as claimed in claim 2, wherein each container is provided a closed flexible tube or bag having inlet and exhaust means for inflating fluid.

9. A method as claimed in claim 8, further comprising locating the tube or bag with locating means to locate the tube or bag in a desired position in the liquid.

10. The method claimed in claim 9 wherein the locating comprises attaching cables to lower ends of the bags and to a base of a container which holds the slurry.

11. A method as claimed in claim 8 further comprising weighting each flexible tube or bag with a weight at a lower end.

12. The method of claim 1 wherein at least one portion of the fluid inflatable means is vertically oriented and wherein the repeated inflating and deflating comprises inflating the portion from a top toward the bottom and deflating the portion from the bottom toward the top.

13. A method for agitating a liquid slurry to increase settling rate of particulate material from the slurry comprising containing a slurry in a settling vessel, gently agitating the liquid slurry and increasing settling rate of particulate material from the slurry by repeatedly inflating and deflating fluid inflatable means immersed in the slurry.

14. The method as claimed in claim 13 wherein the inflating and deflating step comprises inflating a plurality of fluid inflatable containers immersed in the liquid slurry and concurrently deflating a like plurality of fluid inflatable containers immersed in the liquid slurry.

15. The method as claimed in claim 13 wherein the repeated inflating and deflating step comprises switching an operational mode of a valve and feeding compressed air to a vertically elongated container, first inflating a section at the top of the container adjacent to a compressed air feed, feeding more compressed air into the container and increasingly extending the inflated section downward until it reaches the bottom of the container, changing operational mode of the valve to exhaust the inflated container, commencing to deflate a section at the bottom end of the container and extending the deflated section increasingly upward until all of the container is deflated, changing the operational mode of the valve and repeating the procedure.

16. The method as claimed in claim 15 further comprising repeating the steps of the procedure at a frequency of operation that gives about one to ten complete inflations of the container per minute.

17. A method of agitating a slurry to increase its settling rate comprising the steps of
   (a) feeding slurry to a settling vessel having an overflow outlet for clarified liquid and an outlet for settled particles.
   (b) repeatedly inflating and deflating at least one portion of a plurality of fluid inflatable containers in said vessel so as to provide gentle agitation of the slurry.

18. A method as claimed in claim 17, wherein the fluid inflatable containers are vertically oriented and wherein the repeated inflating and deflating comprises inflating the portion from the top toward the bottom and deflating the portion from the bottom toward the top.

19. A method as claimed in claim 18, wherein there are two or more portions of said fluid inflatable containers and the inflating and deflating is controlled to ensure that the total volume of the inflatable containers does not vary during the cycle of operation.

* * * * *